United States Patent [19]

Burge

[11] 4,109,636
[45] Aug. 29, 1978

[54] FORCED CONVECTION OVENS

[75] Inventor: Donald Richard Burge, London, England

[73] Assignee: British Gas Corporation, England

[21] Appl. No.: 753,433

[22] Filed: Dec. 22, 1976

[51] Int. Cl.² ............................................. A21B 1/26
[52] U.S. Cl. ................................................ 126/21 A
[58] Field of Search .................... 126/21 R, 21 A, 19, 126/273, 39 C

[56] References Cited

U.S. PATENT DOCUMENTS

| 2,524,272 | 10/1950 | Sage | 126/21 A |
| 3,384,068 | 5/1968 | Perry et al. | 126/21 A |
| 3,626,922 | 12/1971 | Borge | 126/21 A |
| 3,658,047 | 4/1972 | Happel | 126/21 A |
| 3,973,551 | 8/1976 | Caselani et al. | 126/21 A |

Primary Examiner—Edward G. Favors
Attorney, Agent, or Firm—Larson, Taylor and Hinds

[57] ABSTRACT

A forced convection oven heated by burners in a combustion chamber beneath the oven. Hot gases pass via an outlet port into the restricted part of a pressure-reducing throat forming the central lower portion of a U-shaped passageway whose vertical limbs provide inlet and outlet manifolds to the oven cooking space. The shape of the throat ensures good mixing of these gases with gases circulated by a tangential or centrifugal type fan positioned upstream of the throat. The gas mixture from the inlet manifold enters the cooking space via a perforated side panel and travels across the oven and leaves through perforations in the side panel opposite and thence into the outlet manifold for re-circulation.

2 Claims, 1 Drawing Figure

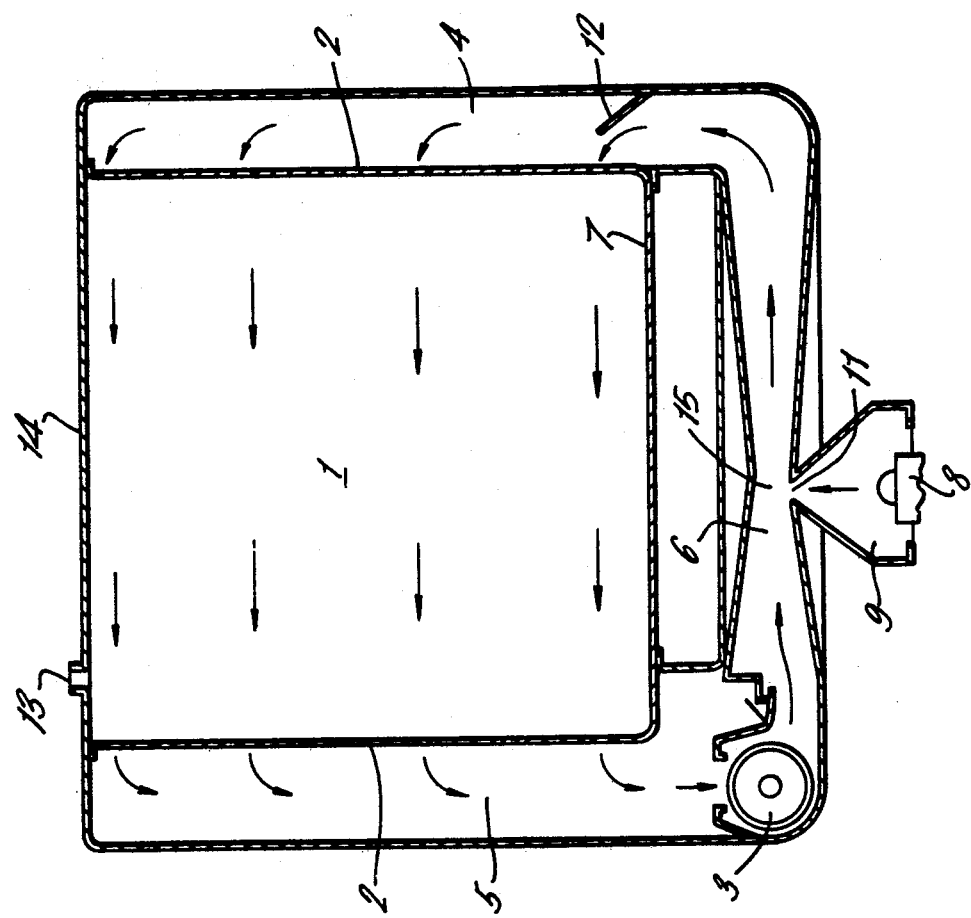

FORCED CONVECTION OVENS

This invention relates to forced convection ovens and is particularly, although not exclusively, concerned with gas fired ovens of this type. Such ovens are conventionally used to heat a number of separate containers or portions of pre-cooked foods, but the ovens may also be used for normal domestic cooking purposes. A desirable characteristic of this form of oven is uniform heating throughout the oven space, and such uniformity, is obtained by controlling the temperature, quantity and flow patterns of circulating medium.

Usually, in present forms of gas heated convection ovens, the circulating medium is generally ambient air which is heated indirectly by some form of heat exchange system, the combustion products from the gas burners being vented to atmosphere. This arrangement tends towards operating inefficiency and adds considerably to the manufacturing and running costs.

It is, therefore, an object of the present invention to provide an improved form of gas fired forced convection oven in which the aforementioned disadvantages are minimised.

According to the invention a forced convection oven comprises a heating or cooking zone, a passage exteriorly of but communicating with said zone, a fan located in the passage for circulating a hot gaseous medium through said passage and zone, a pressure reducing throat forming part of the passage, a combustion chamber having an outlet which communicates with said throat, and at least one fuel burner associated with said combustion chamber, the arrangement being such that, in use of the oven, the hot combustion burner gases issuing from the combustion chamber through its outlet port mixes with the circulating gaseous medium in the throat region of the passage and enters the heating or cooking zone.

Preferably, the passage includes a chamber downstream of the throat forming an inlet manifold for the gaseous medium to the heating or cooking zone, and a further chamber upstream of the throat forming an outlet manifold for the gaseous medium from the zone.

Conveniently, the circulating gaseous medium may be arranged to enter and leave the zone through apertures provided in opposite side panels bounding the zone, which apertures communicate with the respective inlet and outlet chambers of the passage. Then the pressure reducing throat may be positioned beneath the floor of the cooking or heating zone and preferably spaced from it.

Preferably also, the combustion chamber will be located below the throat region of the passage with its outlet port communicating with the restricted portion of the throat which itself could conveniently be located substantially midway along the length of the throat passage.

The fan means, for example, of tangential or centrifugal type, may be located in any convenient position in the passage, and in a preferred arrangement in accordance with the invention this could be upstream of the throat.

The gaseous circulating medium will usually comprise a mixture of air and combustion from the fuel burner, for example, a gas burner, although it will be understood that the fuel burner and combustion chamber could be replaced by one or more electric heating elements arranged in the passage with or without said throat.

One or more deflector plates may be provided nearer the lower end of the inlet chamber of the passage for obtaining a more uniform temperature distribution throughout the cooking or heating zone.

One embodiment of the invention, suitable for use as a domestic or catering food cooking or heating oven, will be described by way of example with reference to the single FIGURE of the accompanying diagrammatic drawing.

Referring to the drawing, a forced convection gas fired oven comprises an enclosed heating or cooking zone 1, having apertured side plates 2, through which a hot mixture of air and combustion products is circulated substantially horizontally across the zone via a communicating passage by means of an electrically powered tangential fan 3. The passage consists of an inlet manifold 4, an outlet manifold 5 and in inter-connected pressure reducing throat 6 which is located beneath, but spaced from the floor 7, of the zone 1. A gas burner 8, housed in the combustion chamber 9, is located centrally below the throat 6. The combustion chamber 9 is formed with sloping side walls which terminate in a relatively narrow outlet port 11 which communicates with the narrow or restricted region 15 of the throat 6 whereby, in use of the oven, to ensure an effective and thorough mixing of the combustion products with the gaseous circulating medium before entering the zone 1. The fan 3 is situated immediately upstream of the throat 6. A deflector plate 12 is provided near the lower region of the inlet manifold 4 which, together with a predetermined arrangement and spacing of the apertures in the side plates 2, provide a substantially uniform flow of gaseous medium across the heating or cooking zone. The oven is provided with a vent or flue 13 at a point in the roof 14 of the zone 1 where the internal pressure is only slightly positive relative to atmosphere. In this way, natural aspiration prevents a build up of excess combustion products within the zone.

It will be seen that the portion of the passage defining the throat is shaped to form a tube whose cross-sectional area progressively decreases to a point of maximum restriction 15 and then progressively increases to approximately its original cross-sectional area. Thus, the restriction 15 causes a sharp rise in the velocity of the circulating medium which, together with an associated drop in static pressure within the throat, enables the combustion products from the combustion champer port 11 to mix thoroughly.

During comparative tests it was seen that a form of direct fired forced convection oven in accordance with the present invention provides a considerable advantage in both efficiency and thermal response times over conventional and previously known forms of ovens. Whilst the invention has been particularly exemplified by the forced convection oven just described, the design is such that it could be used, with the fan switched off, as a conventional oven with natural convection of the hot burner products creating a normal graded temperature throughout the oven cooking zone. This could be particularly advantageous in cases where the electricity supply to the fan, or the fan itself, fails.

Another use of an oven in accordance with the invention is as a food-defrosting unit in which the burner remains inoperative but the fan is switched on so as to circulate ambient air through the zone.

We claim:

1. A forced convection oven having an openable chamber defining a cooking zone, which openable chamber includes top, bottom, back and two side walls, said side walls including apertured side panels therein; a passageway exteriorly of but communicating with said zone; fan means, located in said passageway, for circulating a hot gaseous medium through said passageway and said zone; a combustion chamber; a fuel burner associated with said combustion chamber whereby, in operation, hot combustion burner gases issuing from said combustion chamber mix with the circulating gaseous medium in said passageway and enter said zone; and means for venting said zone to atmosphere; the improvement wherein said passageway is of substantially U-shaped form including two vertical limbs and surrounds said bottom wall and said two apertured side panels, the base part of said U-shaped passageway defining a pressure-reducing throat having a restricted portion positioned beneath, but spaced from, said bottom wall, the two vertical limbs of said U-shaped passageway defining inlet and outlet manifolds, exteriorly adjacent a respective one of said two side panels, for communicating said passageway with said zone through the apertures in said side panels; said combustion chamber being located below said throat with the outlet thereof communicating with the restricted portion of said throat, said fan means being located in said passageway upstream of said throat and arranged in operation forcibly to circulate the hot gaseous medium of air and hot combustion products from said burner substantially horizontally across said zone from said inlet manifold to said outlet manifold.

2. A forced convection oven according to claim 1, wherein said inlet manifold is provided with a deflector plate positioned near the lower region of said inlet manifold so as to provide, in operation, a more uniform temperature distribution throughout said zone.

* * * * *